United States Patent
Baldwin et al.

[11] Patent Number: 5,227,687
[45] Date of Patent: Jul. 13, 1993

[54] STATOR RETENTION MECHANISM

[75] Inventors: Jeffrey D. Baldwin; Larry M. McCulloh, both of Rockford, Ill.

[73] Assignee: Sundstrand Corporation, Rockford, Ill.

[21] Appl. No.: 882,196

[22] Filed: May 13, 1992

[51] Int. Cl.⁵ .................................................. H02K 5/00
[52] U.S. Cl. ........................................ 310/91; 310/217
[58] Field of Search .................... 310/91, 217, 254, 258

[56] References Cited

U.S. PATENT DOCUMENTS

| | | | |
|---|---|---|---|
| 2,492,678 | 12/1949 | Amtsberg | 172/120 |
| 3,110,832 | 11/1963 | Worthington, Jr. et al. | 310/254 |
| 3,162,784 | 12/1964 | Charlin | 310/258 |
| 3,683,221 | 8/1972 | Konovalov et al. | 310/258 |
| 4,145,626 | 3/1979 | Aroshidze et al. | 310/91 |
| 4,306,168 | 12/1981 | Peachee | 310/217 |
| 4,341,968 | 7/1982 | Borden et al. | 310/91 |
| 4,638,199 | 1/1987 | Brem et al. | 310/91 |
| 4,652,782 | 3/1987 | Rossie | 310/217 |
| 4,881,001 | 11/1989 | Patel et al. | 310/258 |
| 4,891,540 | 1/1990 | Cooper et al. | 310/254 |
| 5,053,663 | 10/1991 | Böer et al. | 310/91 |

Primary Examiner—Steven L. Stephan
Assistant Examiner—Matthew Nguyen
Attorney, Agent, or Firm—Antonelli, Terry, Stout & Kraus

[57] ABSTRACT

An electrical machine (100) retained within a housing (116) in accordance with the invention includes a stator having a plurality of laminations (136) which are axially joined together to define a stator core (104) having a plurality of slots (106) which retain electrical windings (112) disposed circumferentially around the stator core which define poles; a first and second retaining mechanism (120) attached to the housing and having a radial projection extending radially inward from an inner cylindrical surface (118) of the housing with the retaining mechanisms having at least one axially projecting retainer (130) extending axially from a surface (132) of the radial projection (126, 128) facing a first or second axial end of the stator core and engaging the first and second axial end of the stator core.

23 Claims, 2 Drawing Sheets

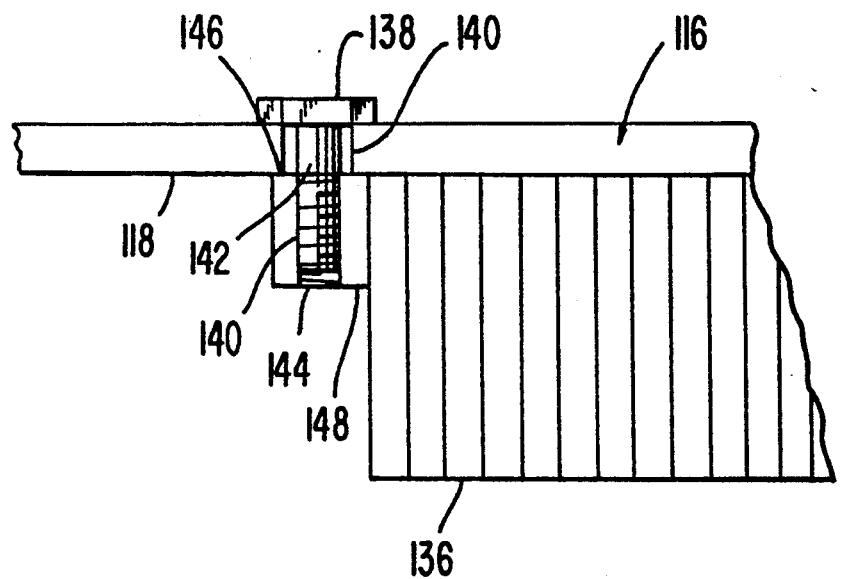
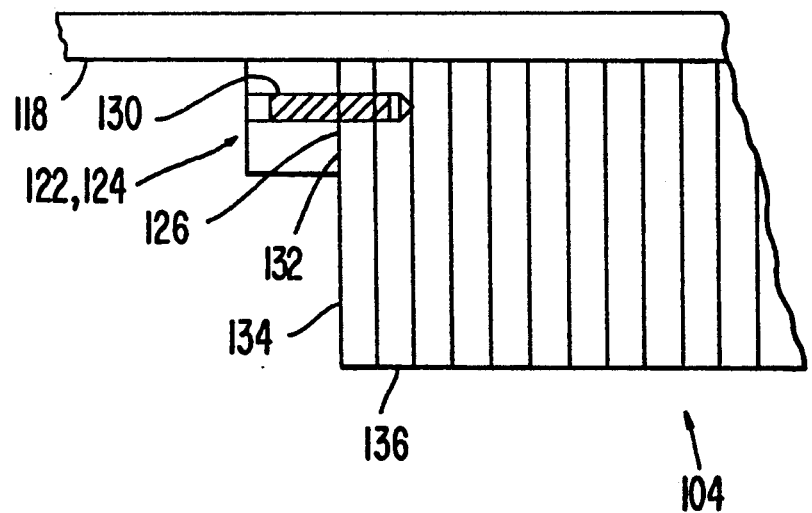

STATOR RETENTION MECHANISM

TECHNICAL FIELD

The present invention relates to mechanisms for retaining the stator of an electrical machine in a housing such as a multiple phase electrical power generator used in airframes.

BACKGROUND ART

The Assignee of the present invention manufactures three phase 400 Hz. electrical power generators used in airframes. A first type of electrical power generating system uses a constant speed drive transmission to convert a variable speed power takeoff from a propulsion engine into a constant speed shaft drive which drives a three phase alternator for producing alternating current for powering appliances in an airframe. These systems run at high rotational speeds, such as 12,000 rpm when a four pole configuration is used, and 24,000 rpm when a two pole configuration is used.

FIG. 1 illustrates a prior art technique of the Assignee for retaining the stator 10 of a three phase electrical power generator, such as an integrated drive generator, used in an airframe such as a two pole or four pole unit in a housing 12. The retention mechanism utilizes a bolt 14 which extends through an aperture 16 in the housing into a tapped, threaded hole 18 within the magnetically permeable laminations 20 of the stator 10. With electrical power generating systems having two or four poles, the overall circumference of the stator is such that approximately one inch of material is available within the bore 18 for receiving the bolt 14 to retain the stator 10 within the housing 12 without protruding into the slots in which the electrical windings are placed. A one inch depth such as that indicated by reference numeral 22 is more than adequate to retain the stator 10 against axial and rotational movement within the housing 12. For the conventional electrical power generating system which is driven by a constant speed drive, the retention scheme illustrated in FIG. 1 is more than adequate to hold the electrical power generator against axial and radial movement within the housing 12. It should be noted that multiple bolts 14 are disposed around the circumference of the housing 12 at axially spaced apart locations. Only one bolt 14 has been shown for purposes of illustration.

A newer design of electrical power generating system for airframes is known as a variable speed constant frequency (VSCF) system. In this system, a power takeoff from a propulsion engine is used to directly drive a multiple phase alternator having six or more poles. The three phase alternating current which is produced by a VSCF alternator, which varies in frequency in direct proportion to the rotational speed of the propulsion engine, is rectified by a three phase full wave rectifier. The resultant DC current is used to drive a three phase solid state inverter which produces three phase 400 Hz. electrical power for powering appliances on an airframe.

Minimizing of weight is of paramount importance in designing equipment for airframes including electrical power generating systems. In the aforementioned constant speed drive system, the use of two or four poles minimizes the overall diameter of the stator. As a result, the thickness 22 which is the maximum depth of penetration without penetrating into the slots may be of sufficient depth, such as one inch, without causing an inordinate increase in the weight of the stator 10 while producing a low reluctance path magnetically coupling the poles together. This results from the fact that the rotor is driven at the aforementioned high rotational velocities of 12,000 or 24,000 rpm which permits a large amount of electrical energy to be generated even though the overall weight of the stator is acceptably low with a thickness, such as one inch, which provides acceptable retention.

On the other hand, the thickness 22 of the stator in an alternator used in the VSCF system is much less as a consequence of the larger diameter required to accommodate six or more poles. In a constant speed drive, the relative thickness of one inch is necessary to provide a low reluctance magnetic path around 90° or 180° of the stator. On the other hand, in an alternator in a VSCF system, the six or more poles reduce the path length between the poles such that a low reluctance magnetic path between the poles may be produced with a much lesser thickness 22 such as one-quarter of an inch. A six or more pole three phase alternator used in a VSCF system works efficiently with the maximum depth 22 being less than one-half of an inch which permits the overall thickness of the stator 10 to be reduced from the greater thickness in a two or four pole constant speed drive system where the greater thickness of one inch is necessary to create the necessary low reluctance path between poles.

In a six or more pole generator in a VSCF system, the typical one-quarter inch thickness 22 to the slot has insufficient retention capability to prevent undesired rotational and axial movement with respect to the housing 12. The depth 22 in a six or more pole generator in a VSCF system is insufficient to provide adequate retention threads in the stator core 10. Moreover, the use of laminations in the stator core to eliminate eddy currents further weakens the core's retention capability to hold threads 18 of the fastener 14. The retention scheme of FIG. 1 when applied to three phase alternators having six or more poles utilized in VSCF systems is inadequate to preclude the possibility of the failure of the retention of the stator 10 within the housing 12.

DISCLOSURE OF INVENTION

The present invention is an improved retaining mechanism for retaining an electrical power generator within a housing where minimizing of the weight of the stator core is important such as in applications in airframes. In accordance with the invention, the stator core of electric machines such as a six or more pole electric power generator utilized in a VSCF electrical power generating system is retained without tapping into the shallow depth of material between the outside circumference of the stator core and the bottom of the slots disposed at the greatest radial dimension of the stator core. A first retaining mechanism and a second retaining mechanism is attached to the housing and has a radial projection extending radially inward from an inner cylindrical surface of the housing. Each retaining mechanism has at least one axially projecting retainer extending axially from a surface of the radial projection facing an axial end of the stator core and engaging the axial end of the stator core. The retaining mechanisms may be rings or, alternatively, a plurality of retaining mechanisms attached to the housing at circumferentially spaced apart locations. A fastener, such as a bolt, extends from an outside surface of the housing through an aperture in the housing into the retaining mechanism to tightly clamp the retaining mechanism to an inside surface of the housing. The retaining mechanism may be made from a material, such as aluminum or steel, which has a much higher strength than the laminated stator core. Furthermore, as a consequence of each retaining mechanism being outboard of the axial ends of the stator core, the thickness of material available to be clamped by the fastener extending through the housing into the retaining mechanism permits sufficient clamping force to fix the stator core to prevent radial and axial movement. At least one axially projecting retainer extends axially from a surface of the radial projection facing one of the first and second axial ends of the stator core. At least one pin and, preferably, a plurality of pins are incorporated which have a sufficient diameter to permit the clamping force to be transmitted from the retaining mechanism to the laminated core. As a consequence of the axially projecting retainers extending axially into the stator core, a bore may be drilled in the stator core between the slots which provides sufficient depth to prevent the stator core from moving axially or radially to avoid the problems of the prior art, especially in a VSCF system alternator having an iron depth of less than one-half of an inch between the outside surface of the stator core and the bottom of the slots.

The present invention has substantial advantages when compared to the prior art. In the first place, the retaining mechanism in the form of either a continuous ring or spaced apart retaining mechanisms, are inexpensive to manufacture and simple to attach to the inner surface of the housing. Additionally, the retaining mechanisms provide a much higher strength retention of the stator core within the housing. The retaining mechanism, while providing a much higher strength attachment of the stator core to the housing, do not add substantial weight to the generator and further provide a much more reliable attachment mechanism which is not subject to failure such as in the prior art where insufficient material depth was present to provide a failure proof attachment of the stator core to the inner cylindrical surface of the housing.

An electric machine retained within a housing in accordance with the invention having an axially extending inner cylindrical surface includes a stator having a plurality of laminations which are axially joined together to define an annular stator core having a plurality of slots which retain electrical windings disposed circumferentially around the stator core which produce magnetic poles with the stator core having an outer cylindrical surface contacting the inner cylindrical surface of the housing along the axially extending inner surface ; a first retaining mechanism attached to the inner cylindrical surface of the housing and having a radial projection extending radially inward from the inner cylindrical surface of the housing with the first retaining mechanism having at least one axially projecting retainer extending axially from a surface of the radial projection facing a first axial end of the stator core and engaging the first axial end of the stator core; and a second retaining mechanism attached to the inner cylindrical surface of the housing, axially spaced from the first retaining mechanism and having a radial projection radially extending inward from the inner cylindrical surface of the housing with the second retaining mechanism having at least one axially projecting retainer extending axially from a surface of the radial projection facing a second axial end of the stator core opposed to the first end of the stator core and engaging the second end of the stator core. The first retaining mechanism may comprise a ring attached to and extending circumferentially around the inner cylindrical surface of the housing and the second retaining mechanism may comprise a ring attached to and extending circumferentially around the inner cylindrical surface of the housing. Alternatively, the first retaining mechanism may comprise a first plurality of retaining mechanisms attached to the housing at circumferentially spaced apart locations around the inner cylindrical surface of the housing and the second retaining mechanism may comprise a second plurality of retaining mechanisms attached to the housing at circumferentially spaced apart locations around the inner cylindrical surface of the housing. Each of the first and second plurality of retaining mechanisms may be attached to the inner cylindrical surface of the housing by a fastener extending radially inward from the housing into the retaining mechanism. Each fastener extends radially from outside of the housing through an aperture in the housing into a bore within the retaining mechanism. A surface of the radial projection of each of the first and second plurality of retaining mechanisms contacts one of the axial ends of the stator core. The bore extends radially inward and has apertures in opposed surfaces. A plurality of axially projecting retainers extend axially from the surface of the radial projection of each of the first and second retaining mechanisms which contact one of the axial ends of the stator. The fasteners of the plurality of retaining mechanisms are each disposed circumferentially between two axially projecting retainers. Each of the at least one axial projection of the first and second plurality of retaining mechanisms engage the first and second ends of the stator by retention in a bore extending through a plurality of the plurality of laminations of the stator core.

BRIEF DESCRIPTION OF THE DRAWINGS

FIG. 3 illustrates a sectional view of FIG. 2 along section lines 3—3.

FIG. 4 illustrates a sectional view of FIG. 2 along section lines 4—4.

BEST MODE FOR CARRYING OUT THE INVENTION

Figure 1:
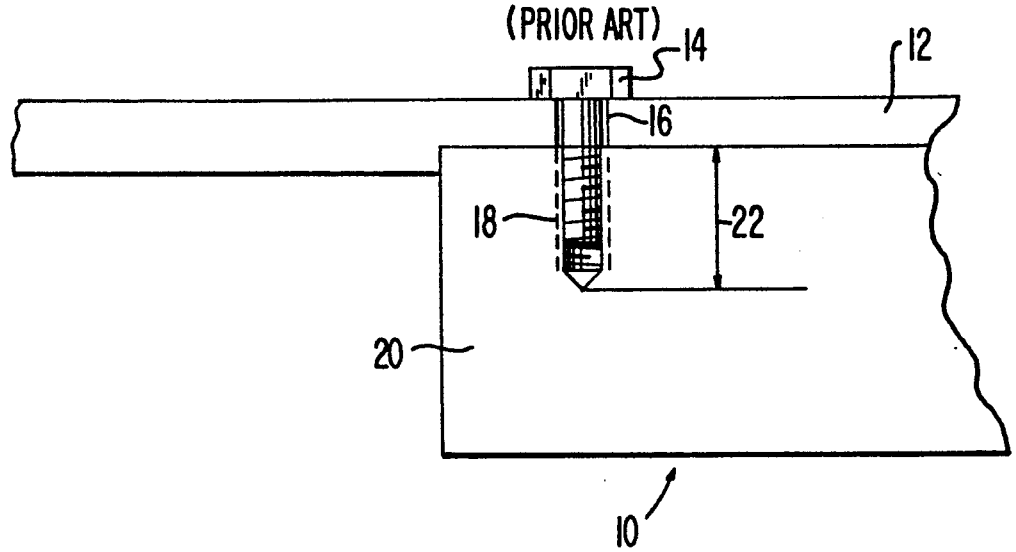
FIG. 1 illustrates a prior art attachment mechanism of a stator to a housing of an electrical power generator used in a constant speed drive electrical power generating system and in a VSCF electrical power generating system.
Figure 2:
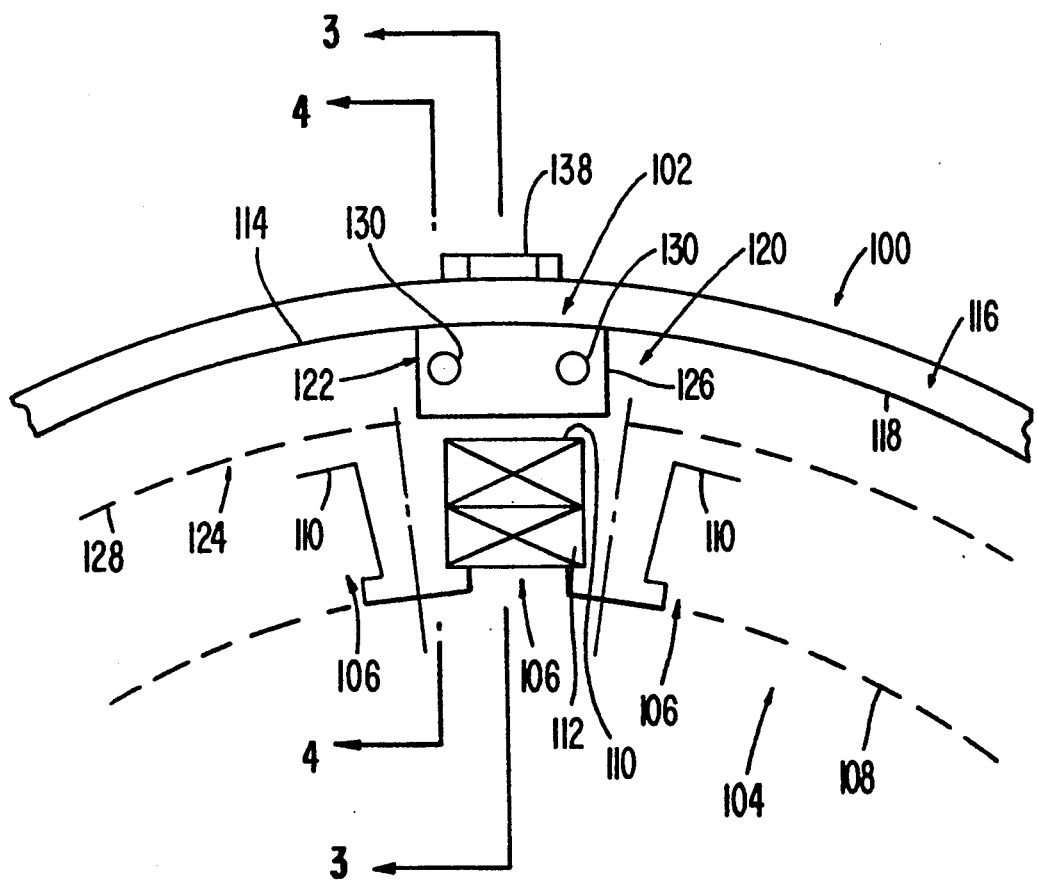
FIG. 2 illustrates a retaining mechanism for an electric machine within a housing in accordance with the present invention.

FIG. 2 illustrates an electric machine 100 having a retaining mechanism 102 in accordance with the present invention and FIGS. 3 and 4 illustrate sectional views of FIG. 2 respectively along section lines 3—3 and 4—4. Like reference numerals identify like parts throughout. The electric machine 100 has a cylindrical stator core 104 which is formed from a plurality of magnetically permeable laminations in accordance with conventional practice for multiple phase alternators, for example, used in VSCF applications. The stator core 104 has a plurality of slots 106 which extend from an inner diameter 108 radially outward to the bottom of the slot 106. Each slot 106 contains electrical windings 112 which are wound into a multiple pole configuration. While only a portion of the stator core 104 is illustrated, it should be understood that the windings 112 are wound into a configuration having six or more poles which minimizes the thickness of the stator core extending from the bottom 110 the slot 106 to the radially outward most extension of the back iron 114 which engages the housing 116 by contact with inner surface 118. It should be understood that the overall thickness of material of the stator core 104 extending from the bottom 110 of the slot 106 to the surface 118 of the housing 116 in a six or more pole generator used for a VSCF is typically one-half an inch or less with one-quarter of an inch of material being common which provides a low reluctance path for coupling magnetic flux between different, but relatively closely spaced, poles. The structure described so far is conventional with a multiple phase alternator used, for example, with VSCF applications.

FIG. 2 illustrates an end view from both a first and a second axial end of the stator core 104. The views are mirror images of each other. In accordance with the invention, the first and second retaining mechanisms 120 are respectively attached to axially spaced apart locations of the housing 116. The first and second retaining mechanisms 120 will be described without differentiation from the end of the stator core to which they are attached. The first and second retaining mechanisms 120 may be either a plurality of individual circumferentially spaced apart retaining mechanisms 122 which are individually attached to the housing 116 at circumferentially spaced apart locations, such as 120° apart, or alternatively, a continuous ring 124 as indicated by phantom lines. In either event, the individual retaining mechanisms 122 or ring 124 are attached to the housing 116 and have a radial projection 126 or 128 projecting radially inward from inner surface 118. The retaining mechanisms 122 or 124 have at least one axially projecting retainer pin 130 and, preferably, a plurality of axially projecting retainers 130 extending axially from a surface 132 of the radial projection 126 facing a first or second axial end of the stator core 104. The surface 126 of the projection 122 contacts the surface 134 of the stator core 104. The at least one and preferably plurality of axially extending retainers 130 extend through a plurality of laminations 136 at a circumferential location between the slots 106 of the stator core 104 which permits sufficient depth of material to transfer the clamping force produced by fastener 138 which holds the retaining mechanism 122 or 124 in place to transfer the clamping force through the retainers 130 to the stator core 104. It should be understood that the diameter of the retainers 130 may be sufficiently large to provide the requisite holding strength to firmly hold the stator core 104 in contact with the inner surface 118 of the housing 116. It should be noted that the retaining mechanism 122 or 124 may be manufactured from a high strength metal, such as aluminum or steel which may be clamped tightly against the inner surface 118 by threaded fasteners 138. The threaded fasteners 138 extend through aperture 140 in housing 116 completely through the radial extension of the retaining mechanism 122 or 124 to permit the retaining mechanism to be clamped tightly against the inner surface 118. The bore 140 is tapped with threads completely through the radial thickness of the retaining mechanism to extend radially between apertures 142 and 144 in opposed surfaces 146 and 148 of the retaining mechanism 122 and 124. Preferably, a plurality of axially projecting retainers 130 extend axially from the surface of the radial projection 122 or 128 such that each fastener 138 is disposed circumferentially between two axially projecting retainers 130. In a typical application of the invention, the depth of the stator core 104 measured between the bottom 110 of the slots 106 and the inner surface 118 of the housing 116 is one-half an inch or less and, preferably, is approximately one-quarter of an inch, in order to lessen the weight of the stator core required to provide a low reluctance path between poles. Moreover, in the foregoing application, typically six or more poles are utilized.

While the invention has been described in terms of its preferred embodiments, it should be understood that numerous modifications may be made thereto without departing from the spirit and scope of the present invention. While the invention has been described in a preferred application in a VSCF electrical power generating system, it should be understood that the invention is applicable to other types of electric machines for attaching the stator core to a housing. It is intended that all such modifications fall within the scope of the appended claims.

We claim:

1. An electric machine retained within a housing having an axially extending inner cylindrical surface comprising:

a stator having a plurality of laminations which are axially joined together to define an annular stator core having a plurality of slots which retain electrical windings disposed circumferentially around the stator core which produce magnetic poles with the stator core having an outer cylindrical surface contacting the inner cylindrical surface of the housing along the axially extending inner surface;

a first retaining mechanism attached to the inner cylindrical surface of the housing and having a radial projection extending radially inward from the inner cylindrical surface of the housing, the first retaining mechanism having at least one axially projecting retainer extending axially from a surface of the radial projection facing a first axial end of the stator core and engaging the first axial end of the stator core; and a second retaining mechanism attached to the inner cylindrical surface of the housing, axially spaced from the first retaining mechanism and having a radial projection radially extending inward from the inner cylindrical surface of the housing, the second retaining mechanism having at least one axially projecting retainer extending axially from a surface of the radial projection facing a second axial end of the stator core opposed to the first end of the stator core and engaging the second end of the stator core.

2. An electric machine in accordance with claim 1 wherein:

the first retaining mechanism comprises a first plurality of retaining mechanisms attached to the housing at circumferentially spaced apart locations; and the second retaining mechanism comprises a second plurality of retaining mechanisms attached to the housing at circumferentially spaced apart locations.

3. An electric machine in accordance with claim 1 wherein:

the first retaining mechanism comprises a ring attached to and extending circumferentially around the inner cylindrical surface of the housing; and the second retaining mechanism comprises a ring attached to and extending circumferentially around the inner cylindrical surface of the housing.

4. An electric machine in accordance with claim 2 wherein:
each of the first and second plurality of retaining mechanisms are attached to the inner cylindrical surface of the housing by a fastener extending radially inward from the housing into the retainer.

5. An electric machine in accordance with claim 4 wherein:
each fastener extends radially from outside of the housing through an aperture in the housing into a bore within the radial projection.

6. An electric machine in accordance with claim 3 wherein:
the surface of the radial projection of each of the first and second plurality of retaining mechanisms contacts one of axial ends of the stator core.

7. An electric machine in accordance with claim 4 wherein:
the surface of the radial projection of each of the first and second plurality of retaining mechanisms contacts one of axial ends of the stator core.

8. An electric machine in accordance with claim 5 wherein:
the surface of the radial projection of each of the first and second plurality of retaining mechanisms contacts one of axial ends of the stator core.

9. An electric machine in accordance with claim 5 wherein:
the bore extends radially inward and has apertures in opposed surfaces.

10. An electric machine in accordance with claim 6 wherein:
the bore extends radially inward and has apertures in opposed surfaces.

11. An electric machine in accordance with claim 3 wherein:
a plurality of axially projecting retainers extend axially from the surface of the radial projection of each of the first and second retaining mechanisms.

12. An electric machine in accordance with claim 4 wherein:
a plurality of axially projecting retainers extend axially from the surface of the radial projection of each of the first and second retaining mechanisms; and
the fasteners of the plurality of retaining mechanisms are each disposed circumferentially between two axially projecting retainers.

13. An electric machine in accordance with claim 5 wherein:
a plurality of axially projecting retainers extend axially from the surface of the radial projection of each of the first and second retaining mechanisms; and
the fasteners of the plurality of retaining mechanisms are each disposed circumferentially between two axially projecting retainers.

14. An electric machine in accordance with claim 6 wherein:
a plurality of axially projecting retainers extend axially from the surface of the radial projection of each of the first and second retaining mechanisms.

15. An electric machine in accordance with claim 7 wherein:
a plurality of axially projecting retainers extend axially from the surface of the radial projection of each of the first and second retaining mechanisms; and
the fasteners of the plurality of retaining mechanisms are each disposed circumferentially between two axially projecting retainers.

16. An electric machine in accordance with claim 8 wherein:
a plurality of axially projecting retainers extend axially from the surface of the radial projection of each of the first and second retaining mechanisms; and
the fasteners of the plurality of retaining mechanisms are each disposed circumferentially between two axially projecting retainers.

17. An electric machine in accordance with claim 9 wherein:
a plurality of axially projecting retainers extend axially from the surface of the radial projection of each of the first and second retaining mechanisms; and
the fasteners of the plurality of retaining mechanisms are each disposed circumferentially between two axially projecting retainers.

18. An electric machine in accordance with claim 10 wherein:
a plurality of axially projecting retainers extend axially from the surface of the radial projection of each of the first and second retaining mechanisms; and
the fasteners of the plurality of retaining mechanisms are each disposed circumferentially between two axially projecting retainers.

19. An electric machine in accordance with claim 1 wherein:
each of the at least one axially projecting retainers of the first and second retaining mechanisms engage the first and second ends of the stator by retention in a bore extending through a plurality of the plurality of laminations of the stator core.

20. An electric machine in accordance with claim 2 wherein:
each of the at least one axially projecting retainers of the first and second retaining mechanisms engage the first and second ends of the stator by retention in a bore extending through a plurality of the plurality of laminations of the stator core.

21. An electric machine in accordance with claim 3 wherein:
each of the plurality of axially projecting retainers of the first and second plurality of retaining mechanisms engage the first and second ends of the stator by retention in a bore extending through a plurality of the plurality of laminations of the stator core.

22. An electric machine in accordance with claim 1 wherein:
a thickness of the stator core measured from a bottom of the slots radially outward to an outside diameter of the stator core is less than one-half of an inch.

23. An electric machine in accordance with claim 2 wherein:
the machine has at least six poles.

* * * * *